United States Patent [19]

Oshima

[11] Patent Number: 5,620,538
[45] Date of Patent: Apr. 15, 1997

[54] ASYMMETRIC RACING TIRE FOR OVAL RACE COURSES

[75] Inventor: Masayuki Oshima, Hiratsuka, Japan

[73] Assignee: The Yokohama Rubber Co., Ltd., Tokyo, Japan

[21] Appl. No.: 576,588

[22] Filed: Dec. 21, 1995

[30] Foreign Application Priority Data

Dec. 28, 1994 [JP] Japan .................................. 6-328361

[51] Int. Cl.$^6$ ................. B60C 3/04; B60C 3/06; B60C 11/00; B60C 15/06
[52] U.S. Cl. ............... 152/209 A; 152/454; 152/455; 152/456
[58] Field of Search ............ 152/209 A, 455–456, 152/454

[56] References Cited

U.S. PATENT DOCUMENTS

| | | | |
|---|---|---|---|
| 3,435,874 | 4/1969 | Mirtain et al. | 152/209 A |
| 3,765,468 | 10/1973 | Verdier | 152/209 A |
| 4,830,077 | 5/1989 | Goto et al. | 152/456 X |
| 4,840,210 | 6/1989 | Kukimoto | 152/209 A |
| 4,848,429 | 7/1989 | Mezzanotte | 152/456 X |
| 4,905,748 | 3/1990 | Kikimoto et al. | 152/456 X |

FOREIGN PATENT DOCUMENTS 3200405  9/1991  Japan .................................. 152/209 A

*Primary Examiner*—Adrienne C. Johnstone
*Attorney, Agent, or Firm*—Nikaido, Marmelstein, Murray & Oram LLP

[57] ABSTRACT

A racing tire for oval race courses, wherein a profile of an outer region of a tread portion which is positioned to be further axially outward toward an outer side of a race course than a center line of the tire and a profile of an inner region of the tread portion which is positioned to be further axially inward toward an inner side of the race course than the same center line are asymmetrical, an outer diameter and thickness of the outer region of the tread portion being larger than an outer diameter and thickness of the inner region of the tread portion, a difference between the outer diameters of portions of the tire spaced from the center line of the tire in the opposite widthwise directions from the center line by a distance corresponding to 45% of a maximum width of the tire being set to 0.5–5.0% of the outer diameter of a portion of the tire on the center line.

13 Claims, 1 Drawing Sheet

ASYMMETRIC RACING TIRE FOR OVAL RACE COURSES

BACKGROUND OF THE INVENTION

This invention relates to a racing tire used on an oval race course, and more particularly to a racing tire for an oval race course which tire can last for a long period of time in a severe race on an oval race course.

In a race on an oval race course provided with banks in the corners and having a simple elliptic shape in plan, vehicles run at a high speed, so that the tires rotate under very severe conditions. When a vehicle runs on a bank in a corner, a load on the portion of a tire tread which is on the outer side of the race course increases greatly. This can cause separation of the belt edge of a tire tread which is on the outer side of the race course. Great wear on the region of a tread surface which is on the outer side of the race course, and even possibly a blowout can occur. Generally, a decrease in the life of the tire occurs.

To deal with these inconveniences, countermeasures are employed, such as changing the manner of setting tires on a vehicle; setting tires on the side of a vehicle which is on the outer side of a race course having an outer diameter which is larger than that of the tires set on the side of the vehicle which is on the inner side of the race course; or setting tires of a rubber material having a high abrasion resistance on the side of a vehicle which is on the outer side of the race course compared with those on the inner side of the course.

However, even when the tire setting manner and the specifications of tires to be set on the side of a vehicle which is on the outer side of a race course are changed, a load on the region of each tire tread which is on the outer side of a race course is still large. Consequently, these countermeasures may not constitute effective enough solutions.

Moreover, when different tires are set on the outer and inner sides of a vehicle which are on the outer and inner sides of a race course, and, when tires of different specifications are set on the front and rear sides of a vehicle, it becomes necessary to provide a plurality of types of tires in accordance with the tire setting positions.

SUMMARY OF THE INVENTION

An object of the present invention is to provide a racing tire for oval race courses, capable of minimizing the occurrence of separation of the belt edge of a tire tread which is on the outer side of a race course or great wear on the region of a tread surface which is on the outer side of the race course or even a blowout, and capable of maintaining the life of a tire for a long period of time.

Another object of the present invention is to provide a racing tire for oval race courses, capable of increasing the life of the tire without deteriorating the rotational characteristics thereof on a straight-extending portion of the oval race course.

Still another object of the present invention is to provide a racing tire for oval race courses, capable of increasing the life of the tire with the specifications of tires to be set on the front, rear, left and right sides of a vehicle all be the same.

The present invention which achieves these objects provides a tire to be set on a racing vehicle running on an oval race course, wherein both end portions of a carcass provided in at least one layer are folded back around bead cores in left and right bead portions from the inner side of the tire to the outer side thereof, bead fillers extending into side wall portions being provided on the outer circumferences of the bead cores, belt layers being provided in the part of a tread portion which is on the outer side of the carcass, characterized in that a profile of an outer region of the tread portion which is positioned to be further axially outward toward the outer side of a race course than a center line of the tire and a profile of an inner region of the tread portion which is positioned to be further axially inward toward the inner side of the race course than the center line of the tire are asymmetrical, an outer diameter and thickness of the outer tread region being larger than an outer diameter and thickness of the inner tread region, a difference between the outer diameters of portions of the tire which are spaced from the center line of the tire in the opposite widthwise directions from the center line by a distance corresponding to 45% of a maximum width of the tire being set to 0.5–5.0% of the outer diameter of a portion of the tire which is on the center line thereof.

The rigidity of the region of the tread portion in the outer side of a race course with respect to a ground contact reaction force occurring when a vehicle runs on a corner bank in an oval race course can be effectively improved by forming an asymmetric tread profile in which the outer diameter and thickness of the outer region of the tire in the outer side of the race course are larger than those of the corresponding region of the tire which is in the inner side of the race course. Therefore, even when a large ground contact reaction force is exerted on the outer region of the tread portion, this tread region is not greatly bent unlike the corresponding region of a conventional racing tire. Accordingly, the generation of heat which is ascribed to the bending of this tread region can be minimized. In this manner, the separation of a belt edge positioned in the same region can substantially be prevented. The occurrence of blowout and great abrasion on the outer region of a tread surface positioned in the outer side of a race course can also be minimized. This improves the durability of the outer region of the tread portion, and the lifetime of the tire is prolonged.

Since a difference between the outer diameters of the portions of the tire which are spaced a distance corresponding to 45% of a maximum width of the tire from the center line of the tire in the opposite widthwise direction thereof is set as mentioned above, the rotational characteristics of the tire on a straight-extending portion of an oval race course are not spoiled, and the lifetime of the tire can be prolonged.

Moreover, tires of the same specifications can be set on the front, rear, left and right sides of a vehicle. Thus, tires having different specifications as in conventional tires need not be used. Accordingly, the tire preparing work can be carried out easily.

DESCRIPTION OF THE PREFERRED EMBODIMENTS

Figure 1:
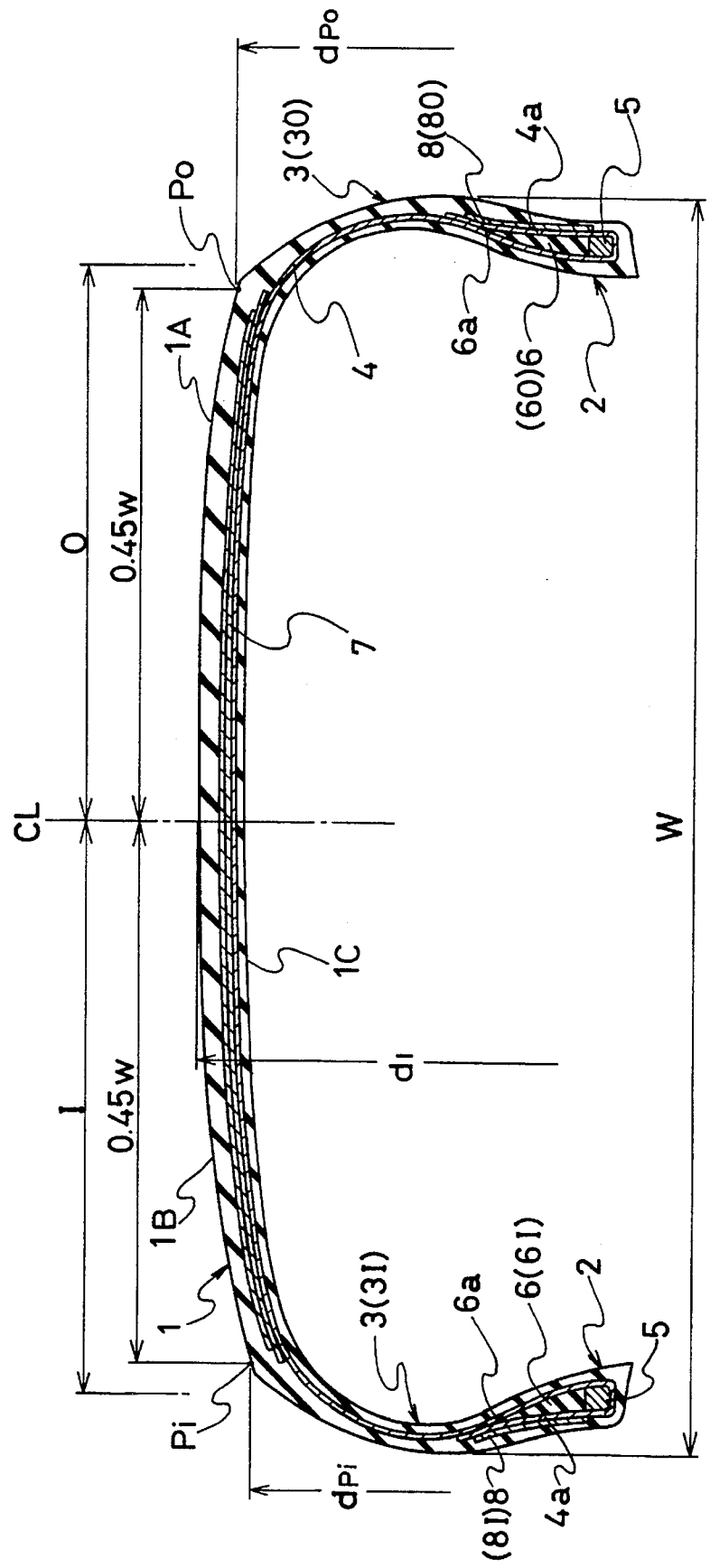
FIG. 1 is a sectional view showing an example of the racing tire for oval race courses according to the present invention taken along the meridian thereof.

Referring to FIG. 1, a reference numeral 1 denotes a tread portion, 2 bead portions, and 3 side wall portions. The left and right side wall portions 3 joined to the left and right bead portions 2 extend in the radially outward direction of the tire, and a tread portion 1 extending in the circumferential direction of the tire is provided between the left and right side wall portions 3.

A single carcass layer 4 is provided in an inner side of the tire, and both end portions 4a of the carcass layer 4 are folded back around each annular bead core 5, which is provided in the left and right bead portions 2, from the inner side of the tire to the outer side thereof. Bead fillers 6 extending in the side wall portions 3 are provided on the outer circumferences of the bead cores 5, and both end portions 4a of the carcass layer extend so as to wrap the bead fillers 6, and then into the outer side portions of the tire beyond the outer circumferential ends 6a of the bead fillers 6.

A plurality of belt layers 7 comprising steel cords arranged inclined with respect to the circumferential direction of the tire are provided on the outer circumferential side of the carcass layer 4 in the tread portion 1. A reference numeral 8 denotes reinforcing layers having reinforcing cords arranged in one direction, and a single reinforcing layer is provided in each of the portions of the tire which are on the outer side of the bead fillers 6 so as to extend from the outer parts of the bead portions 2 to the side wall portions 3.

In the racing tire for oval race courses, which is formed as described above, according to the present invention, the profile of an outer region O of the tread portion 1 which is positioned more axially outward toward the outer side of a race course relative to a center line CL of the tire when the tire is set on a vehicle, and the profile of an inner region I of the tread portion 1 which is positioned axially inward toward the inner side of a race course the center line are set to be asymmetrical.

Referring to the drawing showing a cross-sectional shape of the tire, the outer diameter of a tread surface 1A of the outer region O of the tread portion 1 is made larger than that of a tread surface 1B of the inner region I thereof at the corresponding parts of the tread surfaces 1A, 1B on the left and right sides of the center line CL. The thickness of the outer side region O of the trend portion is set larger than that of the inner side region I thereof at corresponding parts thereof. The profile of the portion of the tread portion 1 which is on the side of an inner surface 1C of the tire is symmetrical.

A difference d ($d_{Po}-d_{Pi}$) between the outer diameters $d_{Po}$ and $d_{Pi}$ of the parts of the tire which are in positions Po (in the outer side region with respect to a race course) and Pi (in the inner side region with respect to the race course) on the tread surfaces 1A, 1B respectively, which points are spaced from the center line CL of the tire in the opposite widthwise directions thereof by a distance corresponding to 45% of a maximum width of the tire, is set to be 0.5–5.0% of an outer diameter $d_1$ of the portion of the tire which is on the center line CL.

According to the present invention, the tire is formed so as to have an asymmetric tread profile in which the outer diameter and thickness of the outer region O with respect to a race course of the tread portion 1 are set larger than those of the inner region I with respect to the race course of the tread portion 1. Therefore, the rigidity of the outer region O of the tread with respect to a ground contact reaction force exerted thereon when a vehicle runs on a corner bank in an oval race course can be improved effectively. In this manner, the bend of the outer region O with respect to the race course of the tread portion which has heretofore been liable to be bent greatly when a large ground contact reaction force is exerted thereon when the vehicle runs on a corner bank in an oval race course can be reduced. This makes it possible to minimize the generation of heat in the outer region O of the tread portion, which is ascribed to the bend of the same region. This can reduce the occurrence of separation of a belt edge positioned in the outer region O, as well as lower the amount of abrasion on the tread surface 1A in the outer region O and reduce the chances of a blowout. Consequently, the durability of the part of the tread portion 1 which is in the outer region O is improved, and the lifetime of the tire can be prolonged. Since it is possible to give a lifetime which is substantially as long as that of the inner region I to the outer region O, the lifetime of the tire can be kept long.

Since the difference d between the outer diameters $d_{Po}$ and $d_{Pi}$ of the tire which are in the position Po in the outer region O and the position Pi in the inner region I respectively is set as mentioned above, the lifetime of the tire can be prolonged without spoiling the rotational characteristics thereof on a straight-extending portion of an oval race course.

Moreover, since tires of the same specifications can be set on the front, rear, left and right sides of a vehicle, tires of different specifications which have heretofore been used need not be used. This enables troublesome tire preparing work to be carried out easily.

When the difference d between the outer diameters $d_{Po}$ and $d_{Pi}$ of the tire is less than 0.5%, the rigidity of the region O on the outer side of a race course of the tread portion cannot be increased satisfactorily, and prolonging the lifetime of the tire becomes difficult. When the difference d exceeds 5.0%, negative factors on a straight-extending portion of an oval race course increase, and lap times decrease. Preferably, the difference d between the two outer diameters of the tire may be set to 3.0–5.0% of the outer diameter $d_1$ thereof for prolonging the lifetime of the tire.

In order to further prolong the lifetime of the tire in the above-described embodiment of the present invention, it is preferable that the rigidity in the radial direction of the tire of the side wall portion 3O joined to the outer region O of the tread portion 1 be set higher than that in the radial direction of the tire of the side wall portion 3I joined to the inner region I of the tread portion 1 (longitudinal rigidity of a side wall portion 3O of a conventional tire).

In this method, for example, the hardness of the bead filler 6₂ extending in the side wall portion 3O can be set higher than that of the bead filler 6I extending in the side wall 3I.

In the above embodiment, a single reinforcing layer 8 is provided on both sides. The longitudinal rigidity of the outer side portion with respect to a race course of the tire can be improved by setting the number of the reinforcing layers 8O in the side wall portion 3O more than that of the reinforcing layer 8I in the side wall portion 3I. Steel cords or aramid fiber cords are preferably used as reinforcing cords constituting the reinforcing layers 8.

In order to easily discriminate the outer region O of the tread portion 1 from the inner region I thereof, it is preferable that an identification mark indicating the direction in which a predetermined side of the tire is to face when it is set on a vehicle be provided on a side wall portion 3 and the like, and this enables a tire fixing operation to be carried out easily. When employed on a side wall portion, such an identification mark may be provided on at least one side wall portion 3.

Although the drawing shows a tire the tread surface of which is formed slick so as to use the tire for a dry road surface, the present invention can also be suitably applied to a tire provided with draining grooves and used when the road is wet.

Although the embodiment described above is provided with a single carcass layer 4, the number of the carcass layer is not limited to one. Needless to say, a plurality of carcass layers 4 may be provided.

The present invention is applied preferably to, especially, a racing tire of an aspect ratio of 30–50 for oval race courses.

EXAMPLES

Tires 1–4 according to the present invention and comparative tires 1, 2 all of which had a tire size of 240/580R13 and an asymmetric tread profile shown in FIG. 1 with a difference d between two outer diameters of the tires varied as shown in Table 1, and a conventional tire of the same tire size having the construction of FIG. 1 in which a tread profile was set symmetrical were manufactured. The aspect ratio of all of these test tires was 45.

These test tires were set on rims of 13×10JJ with an air pressure of 130 kPa and subjected to evaluation tests for separation of a belt edge, blowout generation resistance, abrasion resistance and lap time under the same measuring conditions, which will be shown below. The results are shown in Table 1.

Separation of Belt Edge

Each test tire was set on an indoor drum type endurance test machine, and the travelling time between an instant at which the test was started and an instant at which the separation of a belt edge occurred was measured by setting a camber angle and a slip angle to 3° and 1° respectively and a vehicle speed to a constant level of 325 km/h and increasing a load from 250 kgf in increments of 50 kgf per 2.5 min. The results were evaluated by index values based on 100 which represented the durability of a belt edge of the conventional tire. The larger numerical values indicate higher durability of belt edges.

Blowout Generation Resistance

Each test tire was set on a 2000 cc racing vehicle, which was made run round a 4.0 km oval race course. A travelling distance at which a blowout began to occur in a part of the outer region with respect to the race course of the tread portion of each tire was measured, and the results were evaluated by index values based on 100 which represented the blowout generation resistance of the conventional tire. The larger numerical values indicate longer blowout generating distance and a higher blowout generation resistance.

Abrasion Resistance

Each test tire was set on the same vehicle as mentioned above, which was made run round a 4.0 km oval race course 20 times. An unabraded amount on the most greatly worn portion of the outer region with respect to the race course of each tire was measured, and the results were evaluated by index values based on 100 which represented the abrasion resistance of the conventional tire. The larger numerical values indicate higher abrasion resistance.

Lap Time

Each test tire was set on the same vehicle as mentioned above, which was made run round a 4.0 km oval race course 4 times, and the evaluation was made by the best lap time. The results were indicated by index values based on 100 which represented the lap time concerning the conventional tire. The larger numerical values indicate better lap time.

TABLE 1

|  | Conventional Tire | Comparative Tire 1 | Tire 1 of Present Invention | Tire 2 of Present Invention | Tire 3 of Present Invention | Tire 4 of Present Invention | Comparative Tire 2 |
| --- | --- | --- | --- | --- | --- | --- | --- |
| Difference between outer diameters of two portions of tire (%) | 0 | 0.3 | 0.5 | 1.5 | 3.0 | 5.0 | 6.0 |
| Separation of belt edge | 100 | 100 | 102 | 103 | 105 | 108 | 110 |
| Blow hole generation resistance | 100 | 101 | 102 | 103 | 105 | 108 | 110 |
| Abrasion resistance | 100 | 103 | 110 | 112 | 115 | 115 | 110 |
| Lap time | 100 | 100 | 100 | 100 | 100 | 99 | 97 |

As is clear from Table 1, it is understood that, in the tires according to the present invention, the occurrence of separation of a belt edge in the outer side portion with respect to a race course of a tire tread, the occurrence of a blowout and the presence of great abrasion on the outer region with respect to a race course of a tread surface are minimized. The lap time of the relative vehicles, i.e. the rotational characteristics of the tires on a straight-extending portion of a race course are not spoiled. The life of the tire can be kept long. Although the lap time concerning the tire 4 according to the present invention decreases by 1%, this is within a practically permissible range and substantially negligible.

It is also understood that the occurrence of separation of a belt edge in the outer side portion with respect to a race course of a tire tread, the occurrence of a blowout and the presence of abrasion of the outer regions with respect to a race course of a tread surface can be more improved owing to the difference d between the two outer diameters of the tire set to 3.0–5.0%.

As described above, the tread profile of the tire according to the present invention is formed asymmetrically, i.e., the outer diameter and thickness of the outer region with respect to a race course of the tread portion are set larger than those of the corresponding inner region thereof. In this manner, the rigidity of the outer region of the tread portion with respect to a ground contact reaction force occurring when the relative vehicle runs on a corner bank in an oval course can be increased greatly and effectively. Therefore, even when a large ground contact reaction force is exerted on the outer region of the tread portion when the vehicle corners, the occurrence of a large bend of the outer region of the tread as in the tread of a conventional tire can be avoided. Consequently, the generation of heat in the outer region of the tread portion, which is ascribed to such a bend of the tread, can be minimized. This enables the separation of a belt edge in the outer region with respect to a race course of the tread to be restrained. Further, the occurrence of a blowout in and the presence of great abrasion of the outer region of the tread surface are minimized. Accordingly, the durability of the outer region of the tread portion is improved, and the life of the tire can be kept long.

Since the difference between the outer diameters of the parts of the tire which are in such positions on the tread surface that are spaced from the center line of the tire in the opposite widthwise directions thereof by a distance corresponding to 45% of a maximum width of the tire are set as mentioned above, the lifetime of the tire can be prolonged without spoiling the rotational characteristics of the tire on a straight-extending portion of an oval race course.

Moreover, since tires of the same specifications can be set on a vehicle without using tires of different specifications on the front, rear, left and right sides thereof as with conventional tires of this kind, tires to be set on a vehicle can be prepared easily without making mistakes.

What is claimed is:

1. A tire to be set on a racing vehicle running on an oval race course, wherein both end portions of a carcass provided in at least one layer are folded back around bead cores in left and right bead portions from an axially inner side of said tire to an axially outer side thereof, bead fillers extending into side wall portions being provided on the outer circumferences of said bead cores, belt layers being provided in the part of a tread portion which is on a radially outer side of said carcass, wherein a profile of an outer tread region of said tread portion which is positioned to be further axially outward toward an outer side of a race course than a center line of said tire and a profile of an inner tread region of said tread portion which is positioned to be further axially inward toward an inner side of said race course than said center line of said tire are asymmetrical, an outer diameter and a thickness of said outer tread region being larger than an outer diameter and a thickness of said inner tread region, a difference between the outer diameters of portions of said tire which are spaced from said center line of said tire in the opposite widthwise directions from the center line by a distance corresponding to 45% of a maximum width of said tire being 0.5–5.0% of the outer diameter of a portion of said tire which is on said center line.

2. A racing tire for oval race courses according to claim 1, wherein the rigidity in the radial direction of said tire of said side wall portion joined to said outer tread region of said tread portion is higher than the rigidity in the radial direction of said tire of said side wall portion joined to said inner tread region of said tread portion.

3. A racing tire for oval race courses according to claim 2, wherein the hardness of said bead filler extending in said side wall portion joined to said outer tread region of said tread portion is higher than the hardness of said bead filler extending in said side wall portion joined to said inner tread region of said tread portion.

4. A racing tire for oval race courses according to claim 2, wherein at least one reinforcing layer is provided so as to extend in the part of each of said side wall portions which is on an axially outer side with respect to said tire of the relative bead filler, the number of said reinforcing layers in said side wall portion joined to said outer tread region of said tread portion being larger than the number of said reinforcing layers in said side wall portion joined to said inner tread region of said tread portion.

5. A racing tire for oval race courses according to claim 4, wherein said reinforcing layers have reinforcing cords.

6. A racing tire for oval race courses according to claim 5, wherein said reinforcing cords are steel cords.

7. A racing tire for oval race courses according to claim 5, wherein said reinforcing cords are aramid cords.

8. A racing tire for oval race courses according to claim 1, wherein said difference between the outer diameters of the portions of said tire which are spaced from said center line of said tire in the opposite widthwise directions from the center line by a distance corresponding to 45% of a maximum width of said tire is 3.0–5.0% of the outer diameter of the portion of said tire which is on said center line.

9. A racing tire for oval race courses according to claim 1, wherein at least one of said side wall portions is provided with an identification mark indicating the direction in which a predetermined side of said tire is to face when said tire is set on a vehicle.

10. A racing tire for oval race courses according to claim 1, wherein both end portions of said carcass are extended beyond the outer circumferential ends of said bead fillers and into said side wall portions.

11. A racing tire for oval race courses according to claim 1, wherein a profile of the portion of said tread portion which is on the side of a radially inner surface of the tire is symmetrical with respect to said center line.

12. A racing tire for oval race courses according to claim 1, wherein a partially outer surface of said tread portion is formed slick.

13. A racing tire for oval race courses according to claim 1, wherein the aspect ratio of said tire is 30–50.

* * * * *